United States Patent
Zhao

(10) Patent No.: US 9,537,980 B2
(45) Date of Patent: Jan. 3, 2017

(54) WIRELESS DATA TERMINAL AND IPV4/IPV6 DUAL STACK SUPPORT METHOD THEREFOR

(71) Applicant: ZTE Corporation, Shenzhen, Guangdong (CN)

(72) Inventor: Yonggang Zhao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 27 days.

(21) Appl. No.: 14/439,774

(22) PCT Filed: Jul. 23, 2013

(86) PCT No.: PCT/CN2013/079888
§ 371 (c)(1),
(2) Date: Apr. 30, 2015

(87) PCT Pub. No.: WO2013/178160
PCT Pub. Date: Dec. 5, 2013

(65) Prior Publication Data
US 2015/0296055 A1    Oct. 15, 2015

(30) Foreign Application Priority Data
Nov. 2, 2012   (CN) .......................... 2012 1 0433268

(51) Int. Cl.
*H04W 4/00*       (2009.01)
*H04L 29/06*      (2006.01)
(Continued)

(52) U.S. Cl.
CPC .......... *H04L 69/167* (2013.01); *H04W 76/022* (2013.01); *H04W 76/062* (2013.01); *H04W 80/045* (2013.01)

(58) Field of Classification Search
CPC ..... H04L 69/167; H04L 61/251; H04W 76/02; H04W 76/022; H04W 76/06; H04W 76/062; H04W 80/045
See application file for complete search history.

(56) References Cited

U.S. PATENT DOCUMENTS 6,044,107 A * 3/2000 Gatherer ............... H04L 1/0003
375/222
6,137,839 A * 10/2000 Mannering ........... H04L 1/0003
370/210

(Continued)

FOREIGN PATENT DOCUMENTS

| CN | 101176332 A | 5/2008 |
| CN | 102006338 A | 4/2011 |

(Continued)

OTHER PUBLICATIONS

International Search Report in international application No. PCT/CN2013/079888, mailed on Oct. 31, 2013.

(Continued)

*Primary Examiner* — Kevin Mew
(74) *Attorney, Agent, or Firm* — Oppedahl Patent Law Firm LLC

(57) ABSTRACT

A method for a wireless data terminal to support an Internet Protocol Version 4/Internet Protocol Version 6 (IPv4/IPv6) dual stack is described, including: the wireless data terminal maps a Modem port and a Network Driver Interface Specification (NDIS) port at a user terminal; and the wireless data terminal receives an instruction for establishing a network connection, initiates a Packet Data Protocol (PDP) context activation request to a network which a user expects to connect, and establishes the network connection according to the mapped port, after the network successfully responds to the PDP context activation request. Simultaneously, a wireless data terminal supporting an IPv4/IPv6 dual stack is described.

12 Claims, 2 Drawing Sheets

(51) Int. Cl.
*H04W 76/02* (2009.01)
*H04W 76/06* (2009.01)
*H04W 80/04* (2009.01)

(56) References Cited

U.S. PATENT DOCUMENTS

| | | | |
|---|---|---|---|
| 9,344,402 B2* | 5/2016 | Liu | H04L 61/2007 |
| 2002/0032800 A1* | 3/2002 | Puuskari | H04W 76/022 |
| | | | 709/246 |
| 2004/0151155 A1* | 8/2004 | Jouppi | H04W 76/022 |
| | | | 370/349 |
| 2007/0258399 A1* | 11/2007 | Chen | H04W 76/022 |
| | | | 370/328 |
| 2009/0175215 A1* | 7/2009 | Chen | H04W 76/022 |
| | | | 370/328 |
| 2009/0296630 A1* | 12/2009 | Chen | H04W 76/022 |
| | | | 370/328 |
| 2010/0027467 A1* | 2/2010 | Wu | H04W 48/18 |
| | | | 370/328 |
| 2011/0177811 A1* | 7/2011 | Heckman | H04W 60/00 |
| | | | 455/435.1 |
| 2012/0082095 A1 | 4/2012 | Sun | |
| 2012/0087359 A1 | 4/2012 | Chen | |
| 2012/0102238 A1* | 4/2012 | Wei | G06F 9/4415 |
| | | | 710/13 |
| 2012/0179775 A1* | 7/2012 | Ma | H04W 48/18 |
| | | | 709/217 |
| 2012/0188908 A1* | 7/2012 | Li | H04L 29/12216 |
| | | | 370/254 |
| 2012/0209975 A1 | 8/2012 | Zong | |
| 2012/0238247 A1* | 9/2012 | Wen | H04W 12/08 |
| | | | 455/411 |
| 2012/0331520 A1* | 12/2012 | Zhu | H04W 8/082 |
| | | | 726/3 |
| 2013/0279402 A1* | 10/2013 | Chuang | H04W 76/022 |
| | | | 370/328 |
| 2014/0241206 A1* | 8/2014 | Wang | H04W 4/18 |
| | | | 370/254 |

FOREIGN PATENT DOCUMENTS

| | | |
|---|---|---|
| CN | 102611750 A | 7/2012 |
| CN | 102710629 A | 10/2012 |
| CN | 102938940 A | 2/2013 |
| EP | 2487874 A1 | 8/2012 |

OTHER PUBLICATIONS

English Translation of the Written Opinion of the International Search Authority in international application No. PCT/CN2013/079888 , mailed on Oct. 31, 2013.

Supplementary European Search Report in European application No. 13796742.8, mailed on Jan. 4, 2016.

"Analysis on IPv6 Transition in 3GPP Networks;draft-ietf-v6ops-3gpp-analysis-09.txt" 5. JCT-VC Meeting; 96. MPEG Meeting; mailed on Mar. 1, 2004.

* cited by examiner

WIRELESS DATA TERMINAL AND IPV4/IPV6 DUAL STACK SUPPORT METHOD THEREFOR

TECHNICAL FIELD

The disclosure relates to a technical field of mobile wireless communications, and particularly to a wireless data terminal and a method for the wireless data terminal to support an Internet Protocol Version 4 (IPv4)/Internet Protocol Version 6 (IPv6) dual stack.

BACKGROUND

An IPv6 is used to solve a problem caused by adopting an IPv4 that a network space address is insufficient, but an IPv4 network and an IPv6 network will still coexist for a period of time. A dual stack technique is an efficient technique for transition from the IPv4 to the IPv6, and when applying this technique, a node at a network side is needed to be configured to support an IPv4/IPv6 protocol stack, so that a network node can not only receive and send an IPv4 data packet, but also receive and send an IPv6 data packet.

A user makes a user terminal, such as a Personal Computer (PC) and etc., to access a network through a wireless data terminal. However, in the related art, there is not a solution for supporting the user terminal to simultaneously access the IPv4 network and the IPv6 network at a wireless data terminal side.

SUMMARY

In view of this, a main purpose of an embodiment of the disclosure is to provide a wireless data terminal and a method for the wireless data terminal to support an IPv4/IPv6 dual stack, to at least solve a problem that a user terminal cannot be supported to simultaneously access an IPv4 network and an IPv6 network at a wireless data terminal side.

In order to achieve the above purpose, a technical scheme of the embodiment of the disclosure is implemented as follows.

An embodiment of the disclosure provides a method for a wireless data terminal to support an IPv4/IPv6 dual stack, and this method includes:

mapping, by the wireless data terminal, a Modem port and a Network Driver Interface Specification (NDIS) port at a user terminal; and receiving, by the wireless data terminal, a network connection instruction, initiating a Packet Data Protocol (PDP) context activation request to a network which a user expects to connect, and establishing a network connection according to the mapped port after the network successfully responds to the PDP context activation request.

Preferably, this method may further include: receiving, by the wireless data terminal, a network disconnection instruction, initiating a PDP context deactivation request to the network which the user expects to disconnect, and disconnecting the network connection after the network successfully responds to the PDP context deactivation request.

Preferably, the network connection may include: an IPv4 single stack network connection, an IPv6 single stack network connection, or an IPv4/IPv6 dual stack network connection.

Preferably, the establishing the network connection according the mapped port may include:

when a received instruction is an IPv4 single stack network connection instruction, then establishing a data transmission channel from the Modem port or the NDIS port mapped at the user terminal to an IPv4 network side port;

when the received instruction is an IPv6 single stack network connection instruction, then establishing a data transmission channel from the NDIS port mapped at the user terminal to an IPv6 network side port; and when the received instruction is an IPv4/IPv6 dual stack network connection instruction, then establishing the data transmission channel from the Modem port mapped at the user terminal to the IPv4 network side port, and establishing the data transmission channel from the NDIS port mapped at the user terminal to the IPv6 network side port.

Preferably, this method may further include: when the wireless data terminal establishes the IPv4/IPv6 dual stack network connection, and an IPv4 network connection or an IPv6 network connection is disconnected abnormally, initiating, by the wireless data terminal, the PDP context activation request to the network of which a connection is disconnected, to re-establish the network connection.

An embodiment of the disclosure further provides a wireless data terminal, and this wireless data terminal may include: a mapping unit, an instruction receiving unit, and a network connecting unit, wherein the mapping unit is configured to map a Modem port and a Network Driver Interface Specification (NDIS) port at a user terminal;

the instruction receiving unit is configured to receive a network connection instruction; and the network connecting unit is configured to initiate a Packet Data Protocol (PDP) context activation request to a network which a user expects to connect when the instruction receiving unit receives the network connection instruction, and to establish a network connection according to the port mapped by the mapping unit at the user terminal after the network successfully responds to the PDP context activation request.

Preferably, the wireless data terminal may further include:

a network disconnecting unit, configured to initiate a PDP context deactivation request to the network which the user expects to disconnect when the instruction receiving unit receives a network disconnection instruction, and to disconnect the network connection after the network successfully responds to the PDP context deactivation request; and the instruction receiving unit may be further configured to receive the network disconnection instruction.

Preferably, the network connection may include: an IPv4 single stack network connection, an IPv6 single stack network connection, or an IPv4/IPv6 dual stack network connection.

Preferably, the network connecting unit may be configured to establish a data transmission channel from the Modem port or the NDIS port mapped by the mapping unit at the user terminal to an IPv4 network side port when the instruction receiving unit receives an IPv4 single stack network connection instruction;

to establish a data transmission channel from the NDIS port mapped by the mapping unit at the user terminal to an IPv6 network side port when the instruction receiving unit receives an IPv6 single stack network connection instruction; and to establish the data transmission channel from the Modem port mapped by the mapping unit at the user terminal to the IPv4 network side port, and to establish the data transmission channel from the NDIS port mapped by the mapping unit at the user terminal to the IPv6 network side port, when the instruction receiving unit receives an IPv4/IPv6 dual stack network connection instruction.

Preferably, the network connecting unit may be further configured to initiate the PDP context activation request to the network of which a connection is disconnected, to re-establish the network connection, when establishing the IPv4/IPv6 dual stack network connection and when the IPv4 network connection or the IPv6 network connection is disconnected abnormally.

In the technical scheme provided by the embodiment of the disclosure, the wireless data terminal maps the Modem port and the NDIS port at the user terminal; the wireless data terminal receives the network connection instruction, initiates the PDP context activation request to the network which the user expects to connect, and establishes the network connection according to the mapped port when the network successfully responds to the PDP context activation request, ensuring that the single stack or the dual stack network connection may be established according to a user's requirement when the user terminal connects the network through the wireless data terminal, facilitating the user to use the network, and improving user experience.

In addition, if the wireless data terminal establishes the IPv4 single stack network connection, then the user terminal is accessed the IPv4 network by employing the mapped Modem port or NDIS port; if the wireless data terminal establishes the IPv6 single stack network connection, then the user terminal is accessed the IPv6 network by employing the mapped NDIS port; if the data terminal establishes the IPv4/IPv6 dual stack network connection, then the user terminal is accessed to the IPv4 network by employing the mapped Modem port and the user terminal is accessed to the IPv6 network by employing the mapped NDIS port. In this way, the single stack or dual stack network connection may be established according to the user's requirement, and the user experience is improved.

DETAILED DESCRIPTION

Embodiment 1

Figure 1:
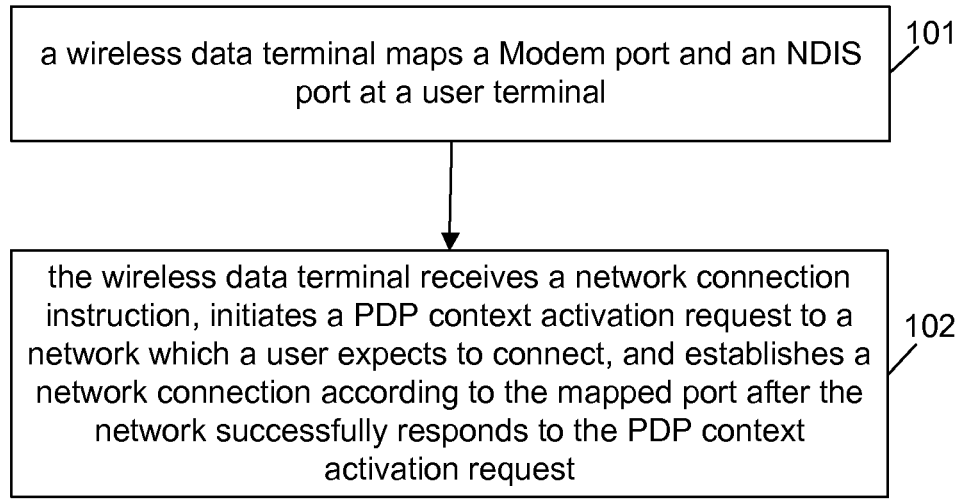
FIG. 1 is a flowchart of implementing a method for a wireless data terminal to support an IPv4/IPv6 dual stack of an embodiment of the disclosure.

FIG. 1 is a flowchart of implementing a method for a wireless data terminal to support an IPv4/IPv6 dual stack of an embodiment of the disclosure, as shown in FIG. 1, the method includes:

Step 101: a wireless data terminal maps a Modem port and an NDIS port at a user terminal;

wherein, the user terminal is a Personal Computer (PC) which has a Universal Serial Bus (USB) interface, and includes a desktop computer, a notebook computer, and a palmtop computer. The user terminal and the wireless data terminal are connected through the USB interface.

Preferably, the mapping, by the wireless data terminal, the Modem port and the NDIS port at the user terminal includes:

the wireless data terminal simultaneously configures the Modem port and the NDIS port at a user terminal side through a driver.

Step 102: the wireless data terminal receives a network connection instruction, initiates a PDP context activation request to a network which a user expects to connect, and establishes a network connection according to the mapped port after the network successfully responds to the PDP context activation request.

Preferably, after the wireless data terminal establishes the network connection, the method further includes:

the wireless data terminal receives a network disconnection instruction, initiates a PDP context deactivation request to the network to which the user expects to disconnect, and disconnects the network connection after the network successfully responds to the PDP context deactivation request.

Preferably, before the wireless data terminal receives the network connection instruction, the method further includes:

the user terminal receives the network connection instruction through a User Interface (UI) and sends the network connection instruction to the wireless data terminal;

correspondingly, before the wireless data terminal receives the network disconnection instruction, the method further includes:

the user terminal receives the network disconnection instruction through the UI, and sends the network disconnection instruction to the wireless date terminal.

Preferably, the network connection includes: an IPv4 single stack network connection, an IPv6 single stack network connection, or an IPv4/IPv6 dual stack network connection.

Preferably, when the wireless data terminal receives an IPv4/IPv6 dual stack network connection instruction, the initiating the PDP context activation request to an IPv4/IPv6 network includes:

the wireless data terminal primarily initiates the PDP context activation request to an IPv6 network, and then initiates the PDP context activation request to an IPv4 network;

or, the wireless data terminal primarily initiates the PDP context activation request to the IPv4 network, and then initiates the PDP context activation request to the IPv6 network.

Preferably, the responding to the PDP context activation request by the network includes:

a Serving General Packet Radio Service (GPRS) Support Node (SGSN) and a Gateway GPRS Support Node (GGSN) in the network perform a PDP context activation operation in accordance with a 3GPP regulation, and return a PDP context activation reception message to the wireless data terminal after the operation is successful, to identify that the PDP context activation request is successfully responded to, and return a PDP context activation refusal message to the wireless data terminal if the operation fails, to identify that it fails to respond to the PDP context activation request.

Wherein, a procedure for the network to respond to the PDP context deactivation request is the same as that for the network to respond to the PDP context activation request, and is not repeated again.

Preferably, the establishing the network connection by the wireless data terminal according to the mapped port includes:

if a received instruction is an IPv4 single stack network connection instruction, then a data transmission channel from the Modem port or the NDIS port mapped at the user terminal to an IPv4 network side port is established;

if the received instruction is an IPv6 single stack network connection instruction, then a data transmission channel from the NDIS port mapped at the user terminal to an IPv6 network side port is established; and if the received instruction is an IPv4/IPv6 dual stack network connection instruction, then the data transmission channel from the Modem port mapped at the user terminal to the IPv4 network side port is established, and the data transmission channel from the NDIS port mapped at the user terminal to the IPv6 network side port is established.

Preferably, after the wireless data terminal makes the port mapped at the user terminal to access a corresponding network, the method further includes:

the wireless data terminal responds to a user terminal request, informs the user terminal of a Domain Name System (DNS) address of the network which is currently accessed, and an Internet Protocol (IP) address allocated for the user terminal.

Preferably, after the wireless data terminal disconnects the network connection, the method further includes:

the user terminal deletes the DNS address and the IP address which are stored locally and correspond to the network which is disconnected with the user terminal.

Preferably, after the wireless data terminal receives the IPv4/IPv6 dual stack network connection instruction and establishes the IPv4/IPv6 dual stack network connection, when the IPv4 network connection or the IPv6 network connection is disconnected abnormally, the method further includes:

the wireless data terminal initiates the PDP context activation request to the disconnected network, to re-establish the network connection.

In a preferred embodiment in which the wireless data terminal re-establishes the network connection, the wireless data terminal initiates the PDP context activation request to the disconnected network, to attempt to establish the network connection, and reports the currently disconnected network connection to the user through a UI of the user terminal after a number of the attempt exceeds a predetermined threshold.

Preferably, after the wireless data terminal receives the IPv6 single stack network connection instruction, when the wireless data terminal initiates the PDP context activation request to the IPv6 network and the IPv6 network does not successfully respond to the PDP context activation request, the method further includes:

the wireless data terminal reports to the user that the IPv6 single stack network connection fails through the UI of the user terminal, and gives the user a prompt whether to continuously attempt to establish the IPv6 single stack network connection, or gives the user the prompt whether to establish the IPv4 single stack network connection.

Preferably, after the wireless data terminal receives the IPv4/IPv6 dual stack network connection instruction, when the wireless data terminal initiates the PDP context activation request to the IPv6 network and the IPv6 network does not successfully respond to the PDP context activation request, the method further includes:

the wireless data terminal reports to the user that the IPv4/IPv6 dual stack network connection fails through the UI of the user terminal, and gives the user the prompt whether to continuously attempt to establish the IPv4/IPv6 dual stack network connection, or gives the user the prompt whether to establish the IPv4 single stack network connection.

Embodiment 2

Figure 2:
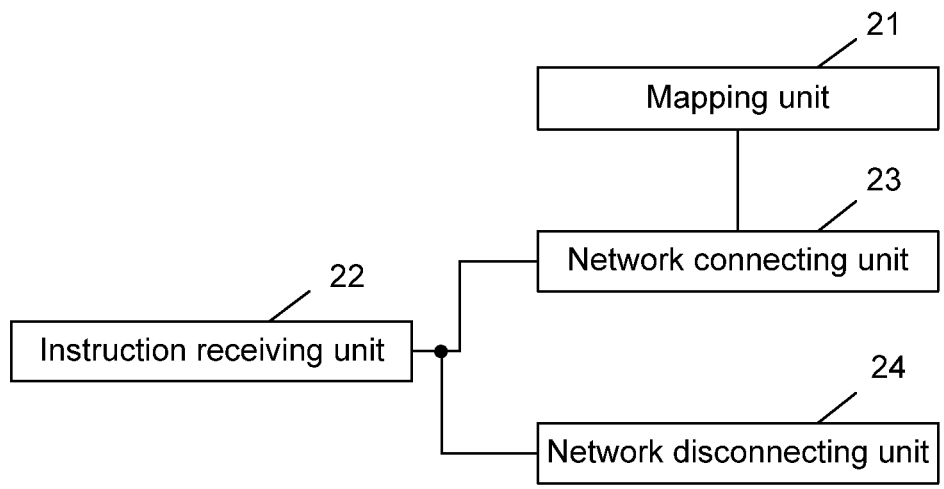
FIG. 2 is a structure diagram of a wireless data terminal supporting an IPv4/IPv6 dual stack of an embodiment of the disclosure.

FIG. 2 is a structure diagram of a wireless data terminal supporting an IPv4/IPv6 dual stack of an embodiment of the disclosure, as shown in FIG. 2, this wireless data terminal includes: a mapping unit 21, an instruction receiving unit 22, and a network connecting unit 23; wherein the mapping unit 21 is configured to map a Modem port and an NDIS port at a user terminal;

the instruction receiving unit 22 is configured to receive a network connection instruction;

the network connecting unit 23 is configured to initiate a PDP context activation request to a network which a user expects to connect when the instruction receiving unit 22 receives the network connection instruction, and to establish a network connection after the network successfully responds to the PDP context activation request.

Preferably, this wireless data terminal further includes:

a network disconnecting unit 24, configured to initiate a PDP context deactivation request to the network which the user expects to disconnect when the instruction receiving unit 22 receives a network disconnection instruction, and to disconnect the network connection after the network successfully responds to the PDP context deactivation request; and the instruction receiving unit 22 is further configured to receive the network disconnection instruction.

Preferably, the network connection includes: an IPv4 single stack network connection, an IPv6 single stack network connection, or an IPv4/IPv6 dual stack network connection.

Preferably, the network connecting unit 23 is further configured to establish a data transmission channel from the Modem port or the NDIS port mapped by the mapping unit 21 at the user terminal to an IPv4 network side port when the instruction receiving unit receives an IPv4 single stack network connection instruction; to establish a data transmission channel from the NDIS port mapped by the mapping unit 21 at the user terminal to an IPv6 network side port when the instruction receiving unit receives an IPv6 single stack network connection instruction; and to establish the data transmission channel from the Modem port mapped by the mapping unit 21 at the user terminal to the IPv4 network side port, and to establish the data transmission channel from the NDIS port mapped by the mapping unit 21 at the user terminal to the IPv6 network side port, when the instruction receiving unit receives an IPv4/IPv6 dual stack network connection instruction.

Preferably, the network connecting unit 23 is further configured to initiate the PDP context activation request to a disconnected network to re-establish the network connection, when establishing the IPv4/IPv6 dual stack network connection and the IPv4 network connection or the IPv6 network connection is disconnected abnormally.

Embodiment 3

Figure 3:
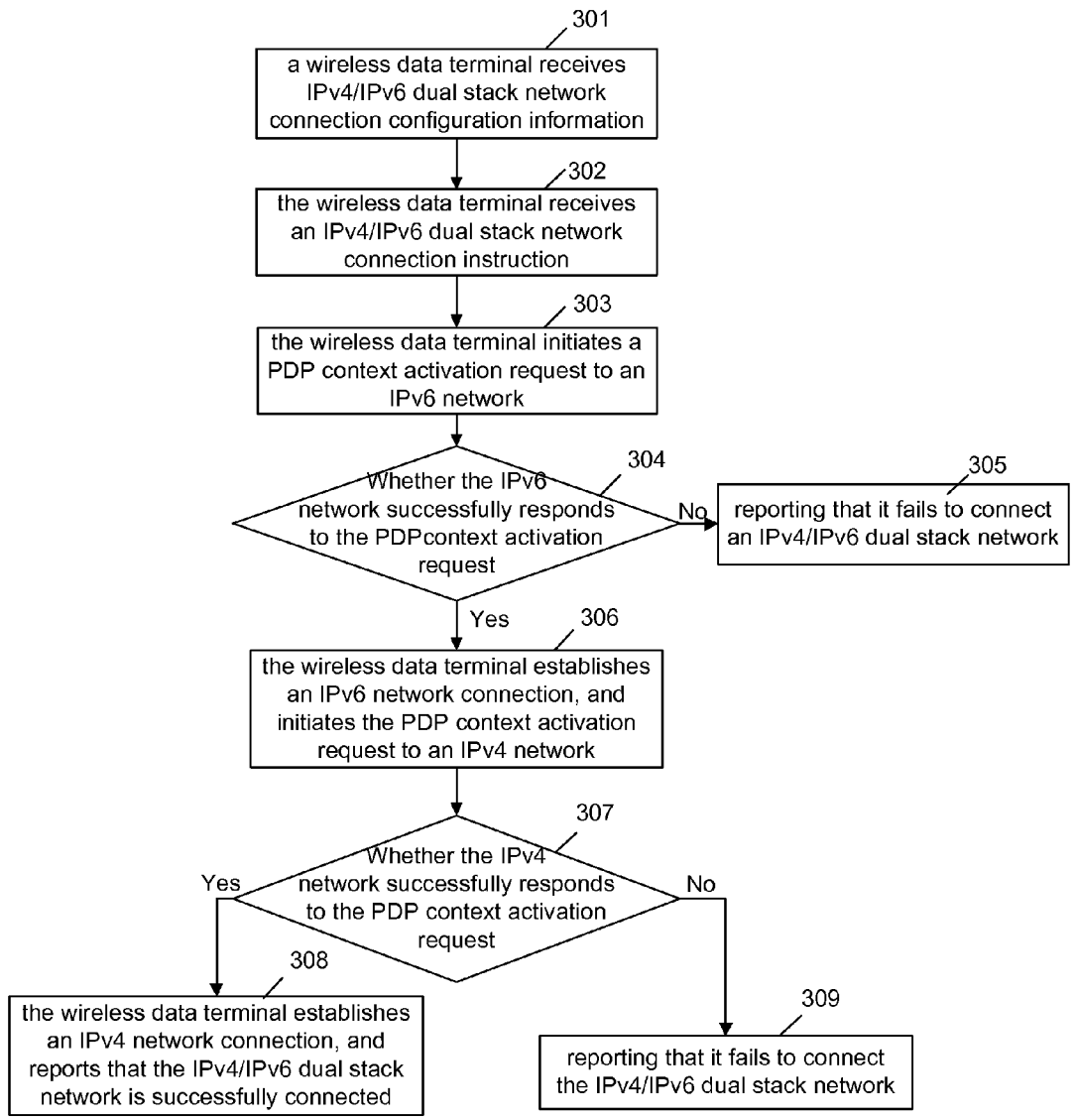
FIG. 3 is a flowchart of implementing network access of a wireless data terminal supporting an IPv4/IPv6 dual stack of an embodiment of the disclosure.

FIG. 3 is a flowchart of implementing network access of a wireless data terminal supporting an IPv4/IPv6 dual stack of an embodiment of the disclosure, as shown in FIG. 3, including:

Step 301: a wireless data terminal receives IPv4/IPv6 dual stack network connection configuration information;

the wireless data terminal receives the dual stack network connection configuration information including an Access Point Name (APN) and authentication information, before performing IPv4/IPv6 dual stack network connection.

Step 302: the wireless data terminal receives an IPv4/IPv6 dual stack network connection instruction;

in this step, a user transmits an IPv4/IPv6 dual stack network connection instruction to the wireless data terminal through a UI of a user terminal.

Step 303: the wireless data terminal initiates a PDP context activation request to an IPv6 network;

in this step, a SGSN and a GGSN in the IPv6 network perform a PDP context activation operation, including analysing the APN and user authentication, and return a PDP context activation receipt message to the wireless data terminal after the operation is successful, and return a PDP context activation refusal message to the wireless data terminal if the operation fails.

Step 304 to step 306: if the IPv6 network successfully responds to the PDP context activation request, then the wireless data terminal establishes an IPv6 network connection and initiates the PDP context activation request to an IPv4 network, otherwise reports that the IPv4/IPv6 dual stack network connection fails;

in step 305, the wireless data terminal reports an IPv4/IPv6 dual stack network connection failure message to the user through the UI of the user terminal, and preferably gives the user a prompt whether to continuously attempt to establish the IPv4/IPv6 dual stack network connection, or gives the user the prompt whether to establish an IPv4 single stack network connection.

In step 306, the wireless data terminal establishes a data transmission channel from an NDIS port to an IPv6 network side port, and responds to a user terminal request to notify the user terminal of a DNS address of the IPv6 network which the user terminal currently accesses and an IP address allocated for the user terminal.

Step 307 to step 309: if the IPv4 network successfully responds to the PDP context activation request, then the wireless data terminal establishes an IPv4 network connection, and reports that the IPv4/IPv6 dual stack network is successfully connected, otherwise reports that it fails to connect the IPv4/IPv6 dual stack network.

In step 308, when the IPv4 network successfully responds to the PDP context activation request, the wireless data terminal will access the IPv4 network at a Modem port mapped by the user terminal, and establish the data transmission channel from the Modem port to the IPv6 network side port, and notify of the DNS address of the IPv4 network which the user terminal currently accesses and the IP address allocated for the user terminal.

All those described above are only preferred embodiments of the disclosure, and are not configured to limit the scope of protection of the disclosure.

INDUSTRIAL APPLICABILITY

In the technical scheme provided by the embodiment of the disclosure, the wireless data terminal maps the Modem port and the NDIS port at the user terminal; the wireless data terminal receives the network connection instruction, initiates the PDP context activation request to the network which the user expects to connect, and establishes the network connection according to the mapped port after the network successfully responds to the PDP context activation request, ensuring that the single stack or dual stack network connection may be established according to the user's requirement when the user terminal connects the network through the wireless data terminal, facilitating the user to use the network, and improving user experience.

What is claimed is:

1. A method for a wireless data terminal to support an Internet Protocol Version 4 (IPv4)/Internet Protocol Version 6 (IPv6) dual stack, comprising:

mapping, by the wireless data terminal, a Modem port and a Network Driver Interface Specification (NDIS) port at a user terminal; and receiving, by the wireless data terminal, a network connection instruction, initiating a Packet Data Protocol (PDP) context activation request to a network which a user expects to connect, and establishing a network connection according to the mapped port after the network successfully responds to the PDP context activation request;

wherein the network connection comprises an IPv4/IPv6 dual stack network connection, and then the establishing the network connection according the mapped port comprises: establishing a data transmission channel from the Modem port mapped at the user terminal to an IPv4 network side port, and establishing a data transmission channel from the NDIS port mapped at the user terminal to an IPv6 network side port when the received instruction is an IPv4/IPv6 dual stack network connection instruction.

2. The method according to claim 1, further comprising:

receiving, by the wireless data terminal, a network disconnection instruction, initiating a PDP context deactivation request to the network which the user expects to disconnect, and disconnecting the network connection after the network successfully responds to the PDP context deactivation request.

3. The method according to claim 1, wherein the network connection further comprises: an IPv4 single stack network connection, or an IPv6 single stack network connection.

4. The method according to claim 3, wherein the establishing the network connection according the mapped port further comprises:

when a received instruction is an IPv4 single stack network connection instruction, then establishing a data transmission channel from the Modem port or the NDIS port mapped at the user terminal to an IPv4 network side port; and when the received instruction is an IPv6 single stack network connection instruction, then establishing a data transmission channel from the NDIS port mapped at the user terminal to an IPv6 network side port.

5. The method according to claim 3, further comprising: when the wireless data terminal establishes the IPv4/IPv6 dual stack network connection, and an IPv4 network connection or an IPv6 network connection is disconnected abnormally, initiating, by the wireless data terminal, the PDP context activation request to the network of which a connection is disconnected, to re-establish the network connection.

6. A wireless data terminal, comprising: a first processor, a second processor, and a third processor, wherein the first processor is configured to map a Modem port and a Network Driver Interface Specification (NDIS) port at a user terminal;

the second processor is configured to receive a network connection instruction; and the third processor is configured to initiate a Packet Data Protocol (PDP) context activation request to a network which a user expects to connect when the second processor receives the network connection instruction, and to establish a network connection according to the port mapped by the first processor at the user terminal after the network successfully responds to the PDP context activation request;

wherein the network connection comprises an IPv4/IPv6 dual stack network connection, and then the third processor is configured, when the second processor receives an IPv4/IPv6 dual stack network connection instruction, to establish a data transmission channel from the Modem port configured by the first processor at the user terminal to an IPv4 network side port, and to establish a data transmission channel from the NDIS port configured by the first processor at the user terminal to an IPv6 network side port.

7. The wireless data terminal according to claim 6, further comprising:

a fourth processor, configured to initiate a PDP context deactivation request to the network which the user expects to disconnect when the second processor receives a network disconnection instruction, and to disconnect the network connection after the network successfully responds to the PDP context deactivation request; and the second processor is further configured to receive the network disconnection instruction.

8. The wireless data terminal according to claim 6, wherein the network connection further comprises: an IPv4 single stack network connection, or an IPv6 single stack network connection.

9. The wireless data terminal according to claim 8, wherein the third processor is further configured to establish a data transmission channel from the Modem port or the NDIS port mapped by the first processor at the user terminal to an IPv4 network side port when the second processor receives an IPv4 single stack network connection instruction; and to establish a data transmission channel from the NDIS port mapped by the first processor at the user terminal to an IPv6 network side port when the second processor receives an IPv6 single stack network connection instruction.

10. The wireless data terminal according to claim 8, wherein the third processor is further configured to initiate the PDP context activation request to the network of which a connection is disconnected, to re-establish the network connection, when establishing the IPv4/IPv6 dual stack network connection and when the IPv4 network connection or the IPv6 network connection is disconnected abnormally.

11. The method according to claim 4, further comprising: when the wireless data terminal establishes the IPv4/IPv6 dual stack network connection, and an IPv4 network connection or an IPv6 network connection is disconnected abnormally, initiating, by the wireless data terminal, the PDP context activation request to the network of which a connection is disconnected, to re-establish the network connection.

12. The wireless data terminal according to claim 9, wherein the third processor is further configured to initiate the PDP context activation request to the network of which a connection is disconnected, to re-establish the network connection, when establishing the IPv4/IPv6 dual stack network connection and when the IPv4 network connection or the IPv6 network connection is disconnected abnormally.

* * * * *